Nov. 9, 1965  A. F. ERICKSON ETAL  3,216,532
SERIES ENERGIZED BRAKE
Filed Jan. 23, 1964  2 Sheets-Sheet 1

INVENTORS
Anton F. Erickson
Robert M. VanHouse
BY O. D. McGraw
ATTORNEY

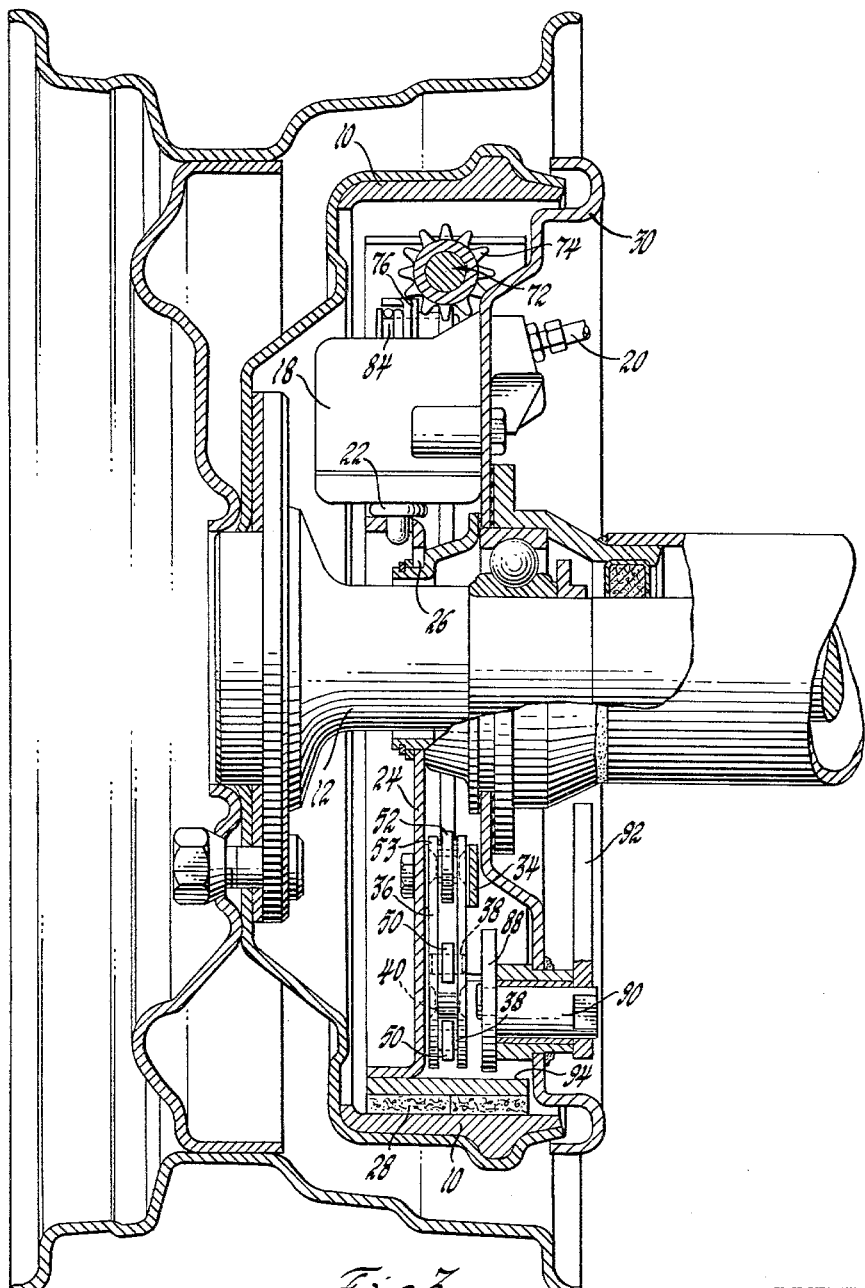

United States Patent Office 3,216,532
Patented Nov. 9, 1965

3,216,532
SERIES ENERGIZED BRAKE
Anton F. Erickson and Robert M. Van House, both of Dayton, Ohio, assignors to General Motors Corporation, Detroit, Mich., a corporation of Delaware
Filed Jan. 23, 1964, Ser. No. 339,715
8 Claims. (Cl. 188—78)

This invention relates to vehicle braking mechanisms and more particularly to a series energized brake.

It is a characteristic of conventional brakes using linings with a high friction coefficient to lock up under a great amount of braking torque. The operating characteristics of a series energized brake of the type described herein are such that the braking torque can be multiplied to a high value without brake lock-up because a more stable low coefficient lining can be employed.

It is an object of the present invention to provide an improved vehicle brake wherein the brake applying force is multiplied and brake lock-up is prevented.

It is another object of the present invention to provide an improved brake which is actuated by an hydraulic cylinder forcing a lever carrying a friction material into engagement with a rotating drum and utilizing the servo action generated thereby to drive a series of conventional linings into engagement with the rotating drum.

It is still another object of the present invention to provide an improved series energized brake incorporating a simple self-adjusting mechanism.

It is a further object of the present invention to provide an improved series energized brake which has a force multiplying means disposed between an actuating hydraulic cylinder and the brake linings.

Further objects and advantages of the present invention will be apparent from the following description, reference being had to the accompanying drawings wherein a preferred embodiment of the present invention is clearly shown.

In the drawings:

FIGURE 3 is a sectional view taken along line 3—3 of FIGURE 1.

Figure 1:
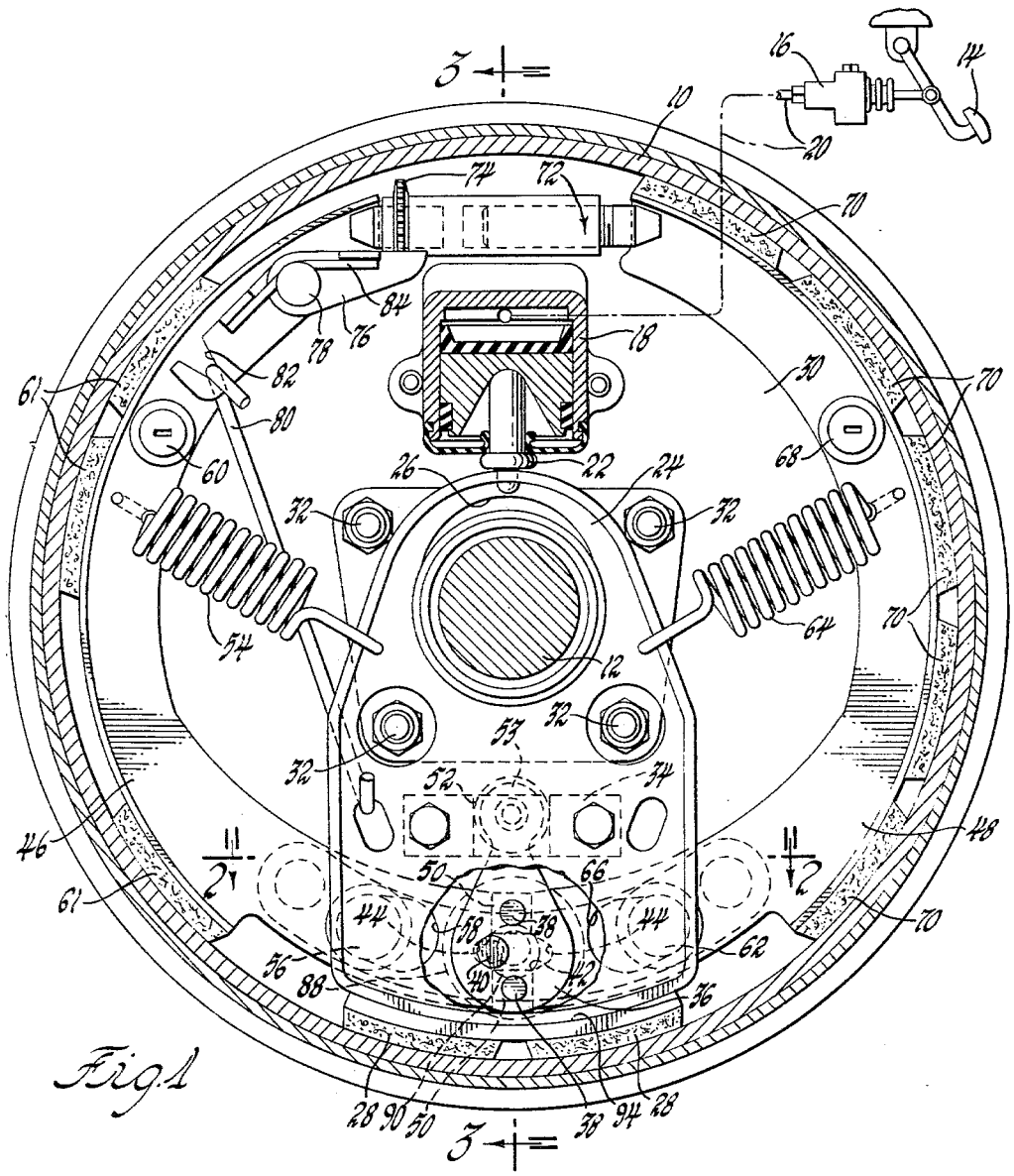
FIGURE 1 is an elevational view of the subject invention shown in its mounted position on a vehicle wheel.
Figure 2:
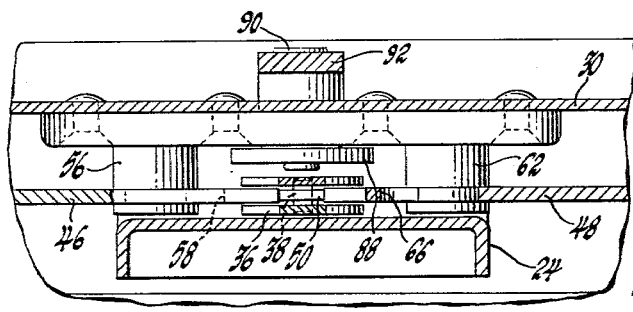
FIGURE 2 is a sectional view taken along line 2—2 of FIGURE 1.

Referring to FIGURE 1, a brake drum 10 is shown circumferentially mounted around an axle 12 of a vehicle, not shown. Hydraulic pressure is generated by a brake pedal 14 forcing fluid from an hydraulic master cylinder 16 to a wheel cylinder 18 through a line 20 in a conventional manner. A connecting link 22 of the wheel cylinder 18 is disposed against a first lever 24 and adapted to move the lever 24 into engagement with the drum 10 in response to movement of the brake pedal 14. The lever 24 fits around the axle 12 and has a substantially elliptically shaped aperture 26 which allows a certain amount of movement of the lever 24 relative to the axle 12. The lever 24 carries a friction material 28 on one end. The friction material 28 would have a low coefficient of friction in the preferred form, but it is understood that a certain amount of the advantages inherent in the subject device would be realized when utilizing a friction material having a higher coefficient of friction, such as that commonly used on duo servo vehicle brakes currently produced. The wheel cylinder 18 is carried by a backing plate 30 which is, in turn, secured to a non-rotating portion of the vehicle through the bolts 32 in any well-known manner. Therefore, it is clear that the backing plate 30 always remains fixed relative to the brake drum 10 which is adapted to be rotatable as the vehicle moves.

A guide 34 is bolted to one side of the lever 24 and serves to slidably locate one end of a second lever 36. The lever 36 is comprised generally of two parallel disposed plates which are kept in fixed parallel relationship by a pair of pivot pins 38. A locating pin 40 carried by the lever 36 can fit in either end of a slot 42 formed by a pair of opposed grooves 44. The grooves 44 are indentations formed in the ends of a brake shoe 46 and a brake shoe 48. A pair of pivoting blocks 50 is rotatable carried by the pivot pins 38 and serves to maintain the brake shoes 46 and 48 in fixed, spaced relationship while the braking system is deenergized. A roller 52 may be carried by the end 53 of the second lever 36 and is adapted to reduce the friction between the lever 36 and the guide 34 during brake energization. In some installations it is satisfactory to utilize the rounded lever end in direct contact with the guide 34.

A spring 54 serves to bias the brake shoe 46 against an anchor pin 56 by engaging the brake shoe 46 with one end and the lever 24 with another end. A slot 58 formed in a web of the brake shoe 46 allows a certain amount of relative movement between the brake shoe 46 and the anchor pin 56 during energization of the brake. The brake shoe 46 is also held in biased engagement with the backing plate 30 by means of a spring retaining assembly 60. A friction material 61 is carried on the outer arcuate portion of the brake shoe 46 and is adapted to be driven into engagement with the brake drum 10 during rotation thereof to provide a braking force for the vehicle.

The brake shoe 48 is essentially a duplicate of the brake shoe 46 and is mounted in opposed disposition to the brake shoe 46 and is adapted to engage another portion of the brake drum 10 during rotation thereof to effect a braking action. The brake shoe 48 is biased towards an anchor pin 62 by means of a spring 64 which draws the brake shoe 48 towards the lever 24 in the same manner as the spring 54. A slot 66 formed in one web of the brake shoe 48 allows a certain amount of relative movement between the brake shoe 48 and the anchor pin 62 during brake energization. A spring retaining assembly 68 maintains the brake shoe 48 in biased engagement with the backing plate 30. Friction material 70 is carried on the outer arcuate surface of the brake shoe 48 and is adapted to engage the brake drum 10 during rotation thereof to provide a braking action for the vehicle.

An expandable device 72 is disposed between opposed ends of the brake shoes 46 and 48 and serves to maintain the brake shoes 46 and 48 a predetermined distance from the drum 10. A star wheel 74 is arranged to drive the expandable device 72 apart during rotation of the star wheel 74. The expandable device 72 is an adjusting mechanism for brakes well known in the art and does not form any part of the subject invention except as it cooperates with the invention in inventive combination.

A lever 76 is pivotally mounted at point 78 on the brake shoe 46. One end of the lever 76 engages the star wheel 74 and is adapted to rotate the star wheel 74 during a brake application while the drum 10 is rotating in a counterclockwise direction as viewed in FIGURE 1. An adjusting link 80 engages the lever 24 on one end and a slot 82 formed in the lever 76 on another end. A spring 84 engages the brake shoe 46 and the lever 76 to return the lever 76 to a poised position relative to the star wheel 74 after the lever 76 has been pivoted during a brake application. The cooperation of the lever 76 and star wheel 74 serves as an adjusting mechanism that automatically positions the friction materials 61 and 70 nearer the rotating drum as wear occurs in the friction material after repeated brake actuations. The cooperation of the lever 76 with the star wheel 74 is more clearly illustrated in FIGURE 3.

It is understood that the lever 76 might be pivotally mounted on the brake shoe 48 in a given installation and adapted to cooperate with an expandable device 72 that is mounted in a reverse disposition to provide an automatic brake adjustment during a rotation of the drum 10 in a clockwise direction.

In operation, the brake actuation is initiated by the operator of the vehicle exerting foot pressure on the pedal 14. In any manner well known in the art, hydraulic pressure is generated in the wheel cylinder 18. The connecting link 22 is pushed in the direction of the lever 24. The lever 24 is thereby driven into engagement with the rotating drum 10. It will be assumed for purposes of this explanation that the drum is rotating in a counterclockwise direction as viewed in FIGURE 1.

As the lever 24 moves in the direction of the rotating drum, the friction material 28 carried by the lever 24 engages the inside surface of the drum and is drawn in the direction of rotation. As the lever 24 moves, the guide 34, carried on one surface of the lever 24, is likewise drawn in the direction of drum rotation. This causes a pivoting of the lever 36 around the locating pin 40. As the lever 36 pivots around the pin 40, the pivoting blocks 50 drive the opposed surfaces of the brake shoes 46 and 48 in opposite directions causing the friction materials 61 and 70, carried by the brake shoes 46 and 48, respectively, to come into engagement with the inside of the rotating drum 10. In this manner, pressure can be transmitted from the wheel cylinder 18 to the inside surface of the brake drum 10 to impede the rotation thereof.

It is apparent from an examination of the mechanical forces involved in the pivoting of the lever 36 that a multiplication of force takes place. Depending on the direction of rotation of the drum 10, the fulcrum point of the first lever is on either side of the elliptical aperture 26. The mechanical advantage between the contact point of the friction material 28 and the fulcrum point on either side of the elliptical slot 26 is approximately 2.3 to 1 in the example given when operating against roller 52 of the lever 36. It is understood that this mechanical advantage can be quantitatively controlled by the design of the particular lever on a given weight automobile and the invention is not meant to be limited to the particular values given.

Secondly, an increase in mechanical advantage is gained by the pivoting of the lever 36 around either of the pivot pins 38. The pivoting blocks 50 carried by the pivot pins 38 bear against opposed surfaces of the brake shoes 46 and 48 to drive them in opposite directions. It is apparent from the explanation of the operation and description of structure given that either of the blocks 50 will act as the fulcrum point for the lever 36 depending on the direction of rotation of the drum 10. Again, the mechanical advantage derived from the lever 36 is dependent upon the design of the lever and the weight of the vehicle to be stopped.

Referring to FIGURE 1 and assuming the direction of rotation of the drum 10 as being in a counterclockwise fashion as viewed therein, a movement of the lever 24 in a counterclockwise direction around the axle 12 will result in the adjusting link 80 being pulled in that same direction. One end of the adjusting link 80 engages the lever 24 and the other end of the link 80 engages the slot 82 in the lever 76. Therefore, as the lever 24 moves in a counterclockwise fashion, the lever 76 will likewise be pivoted in a counterclockwise fashion around the point 78 thereby rotating the star wheel 74 in an adjusting movement. The expandable device 72 is so arranged that movement of the star wheel 74 by the lever 76 will result in the ends of the brake shoes 46 and 48 being driven further apart and into closer proximity to the drum 10.

As pressure is released from the brake pedal 14, the lever 24 is returned to a centered position relative to the brake shoes 46 and 48 and will follow a piston 86 in the wheel cylinder 18 to a deenergized position. This movement of the lever 24 in a return fashion will likewise relieve the pressure of the spring 84 from the lever 76, thereby repositioning the lever 76 to a poised position relative to the star wheel 74.

FIGURE 3 illustrates another feature of the subject invention which provides a means of actuating the braking mechanism by mechanical means. Such a system has utility as an emergency or parking brake for a vehicle. An eccentric cam member 88 is rotatably mounted on a shaft 90. A lever 92 is carried by the shaft 90 so as to be rotatable therewith. The lever 92 can be moved in any manner, for example, by a cable, around the axis of rotation of the shaft 90 until the member 88 contacts an inside edge 94 of the lever 24. The lever 24 will be driven into engagement with the drum 10 and the same braking action previously described will take place if the vehicle is in motion. It is understood that a braking action will take place if the drum 10 is stationary. The pressure of friction material 28 carried by the lever 24 will be sufficient to prevent rotation of the drum 10 if the vehicle is stationary.

The utility of the present invention becomes obvious in an application of stopping a motor vehicle. The effective forces available through the hydraulic system to the wheel cylinder are effectively multiplied by the interaction of the first and second lever means in a braking application. Therefore, it becomes possible to utilize hydraulic system components of moderate size and still gain a high degree of force application to the rotating drum to bring about a stopping of the vehicle. Therefore, low friction coefficient brake linings can be used which are more stable than linings having a high coefficient of friction during severe brake applications.

In certain applications, the subject invention may, in and of itself, serve to replace an expensive power booster assembly for the braking system of a vehicle when the weight of the vehicle is within certain acceptable limits. Utilizing brake systems of common design, an equal amount of vehicle weight cannot be effectively stopped without the use of more expensive hydraulic components or booster mechanisms.

While the embodiment of the present invention, as herein disclosed, constitutes a preferred form, it is to be understood that other forms might be adopted.

What is claimed is as follows:

1. A braking mechanism for a vehicle having a rotating drum, said braking mechanism comprising; fluid operable means carried in juxtaposed to the rotating drum on a fixed portion of the vehicle, first lever means operatively associated with said fluid operable means and being disposed for sliding movement towards the rotating drum, said first lever means having a frictional surface adapted to engage the rotating drum thereby pivoting the first lever means in the direction of drum rotation, second lever means slidably carried by said first lever means and adapted to be pivoted thereby, and a plurality of frictional members disposed in close proximity to the rotating drum and being adapted to be driven into engagement with the rotating drum by said second lever means and generating a servo action thereby, said first lever means and said second lever means cooperating to provide a force multiplication of a force from said fluid operable means as the frictional members move into engagement with the rotating drum.

2. A braking mechanism for a vehicle having a rotating portion, said braking mechanism comprising; a support member, first lever means pivotally and slidably mounted on a non-rotating support member, fluid operable means mounted on said support member for slidably driving said first lever means, a rotating drum attached to the vehicle rotating portion adjacent said support member, said first lever means carrying a frictional element thereon and adapted to be pivoted by movement of the rotating drum as the frictional element comes into contact with the rotating drum as the fluid operable means drives the first lever means in the direction of the rotating drum, a plurality of frictional means movably carried on said support member in close proximity to the rotating drum and being adapted to be driven into engagement therewith, and second lever means movably mounted on said first lever means and carrying pivotable members disposed between the plurality of frictional members for driving the frictional members into engagement with the rotating portion of the vehicle, said first lever means arranged to pivot said second lever means in a manner providing a force multiplication as the frictional element carried by the first lever means moves in the direction of rotation of the rotating portion thereby increasing the force generated by the fluid operable means as it initiates a braking action.

3. A braking mechanism for a vehicle having a rotating drum, said braking mechanism comprising; plate means carried by a fixed portion of the vehicle, fluid operable means carried by said plate means and being disposed within the periphery of the rotating drum, first lever means operatively associated with said fluid operable means and being adapted to be driven into engagement with the rotating drum, a plurality of brake shoes carrying frictional elements thereon and being disposed in juxtaposition to an interior surface of the rotating drum, and second lever means pivotally mounted between the plurality of brake shoes and having rotatable members positioned between the brake shoes, said second lever means having an arm extension adapted to be levered on the pivotal mounting by the first lever means as the first lever means is driven into engagement with the rotating drum whereby at least one of the brake shoes is driven into engagement with the rotating drum in a force multiplying manner, and another of the brake shoes is driven into engagement with the rotating drum in a servo action generated by the other brake shoe.

4. A braking mechanism for a vehicle having a rotating drum, said braking mechanism comprising; mounting means carried by a fixed portion of the vehicle, first means carried by the mounting means and being responsive to hydraulic pressure, first lever means operatively engaged for translational movement toward the rotating drum by said first means, said first lever means being rotatably mounted to allow one portion of the first lever means to move in an arcuate path when engaging the rotating drum during one extreme of translational movement, a plurality of brakes shoes carrying frictional elements thereon and being biasedly carried by said mounting means in juxtaposition to the rotating drum, a plurality of brake shoes having first ends positioned in opposition to each other and arranged to be adjustably moved with respect to each other, said plurality of brake shoes having second ends biased toward one another, and second lever means pivotally disposed between the biased second ends of the brake shoes and being slidably and pivotally carried by said first lever means, at least one of the plurality of brake shoes being adapted to be driven into engagement with the rotating drum by the first lever means acting through said second lever means as said first lever means moves in an arcuate path after engaging the rotating drum at one extreme of translational movement, the first lever means driving the second lever means in the direction of arcuate movement thereby levering the plurality of brake shoes in opposite directions.

5. A braking mechanism for a vehicle having a rotatable drum adapted to be frictionally engaged during a period of rotation to prevent further rotation thereof, said braking mechanism comprising; fluid operable means, first lever means carrying a frictional element and adapted to be driven into engagement with the rotating drum by the fluid operable means, second lever means slidably carried by said first lever means and adapted to be pivoted in either of two directions, friction means disposed in juxtaposition to the rotating drum and having separating means disposed between first portions of the friction means for maintaining a preset clearance between the friction means and the rotatable drum and said second lever means disposed between second portions of the friction means for moving said friction means into braking engagement with said drum, and means including a biased pivotable lever adapted to drive the separating means disposed between the friction means in an adjusting manner as the first lever means is driven into engagement with the rotatable drum by the fluid operable means to pivot said second lever means to move said friction means into braking engagement with said drum.

6. A braking mechanism for a vehicle having a rotatable drum and arranged to stop the vehicle by frictionally engaging the rotatable drum, said braking mechanism comprising; a series of brake shoes carrying frictional elements thereon and adapted to be driven into engagement with the rotatable drum, expandable means for maintaining the series of brake shoes in separated disposition and in proximity to the rotatable drum, fluid operable means carried in fixed relationship with respect to the rotating drum, first lever means carrying a frictional element thereon and being adapted to be driven into frictional engagement with the rotatable drum by the fluid operable means, second lever means pivotally mounted between the brake shoes and arranged to be driven in either of two directions by the first lever means in response to pressure from the fluid operable means and servo action of the first lever means and the rotatable drum whereby a braking action is effected, and means including a pivoted force transmitting member having an eccentric portion adapted to drive the first lever means into engagement with the rotating drum independently of the fluid operable means.

7. A device according to claim 6 wherein the static distance between the plurality of brake shoes is varied by a pivoted member mounted on one of the brake shoes and adapted to be driven into engagement with the expandable means by the first lever means as it moves into engagement with the rotating drum.

8. A braking mechanism for a vehicle comprising; a drum arranged to rotate with one of the wheels of the vehicle, friction means adapted to be driven into engagement with the rotating drum to impede the rotation thereof, fluid operable means carried by a fixed portion of the vehicle, lever means operatively associated with the fluid operable means to drive the friction means into engagement with the rotating drum, at least one of the lever means having a frictional element disposed thereon and adapted to be driven into engagement with the rotating drum which causes a movement of the lever means in an arcuate path in the direction of rotation of the drum, at least one other of said lever means being a pivotable member adapted to spread the friction means apart and into engagement with the rotating drum whereby a servo action on the friction means is established, the pivoting of the lever means being in response to pressure from said fluid operable means and the rotation of the drum, and means responsive to movement of said lever means to adjust the clearance between the rotatable drum and the frictional elements as wear occurs thereon.

References Cited by the Examiner
UNITED STATES PATENTS

| | | | |
|---|---|---|---|
| 1,838,131 | 12/31 | Bendix | 188—78 |
| 1,876,265 | 9/32 | Tucker | 188—152.84 |
| 1,922,054 | 8/33 | Magee | 188—79.5 |
| 2,355,827 | 8/44 | Stelzer | 188—152.84 X |
| 3,016,990 | 1/62 | Towns | 188—79.5 |

ARTHUR L. LA POINT, *Primary Examiner.*

R. DAVID BLAKESLEE, *Examiner.*